United States Patent
Sun

(10) Patent No.: US 11,984,805 B2
(45) Date of Patent: May 14, 2024

(54) POWER CONVERTER AND CONTROL CIRCUIT THEREOF

(71) Applicant: Shanghai Bright Power Semiconductor Co., Ltd., Shanghai (CN)

(72) Inventor: Shungen Sun, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 28 days.

(21) Appl. No.: 17/553,968

(22) Filed: Dec. 17, 2021

(65) Prior Publication Data

US 2022/0209662 A1    Jun. 30, 2022

(30) Foreign Application Priority Data

Dec. 31, 2020  (CN) .......................... 202011622801.3

(51) Int. Cl.
*H02M 3/155*      (2006.01)

(52) U.S. Cl.
CPC .................................. *H02M 3/155* (2013.01)

(58) Field of Classification Search
CPC .......................................... H02M 3/155–1588
See application file for complete search history.

(56) References Cited

U.S. PATENT DOCUMENTS

| | | | | |
|---|---|---|---|---|
| 5,973,522 A * | 10/1999 | Coy | ....................... | H03K 4/502 |
| | | | | 327/131 |
| 7,265,530 B1 * | 9/2007 | Broach | ................. | H02M 3/156 |
| | | | | 324/117 R |
| 8,169,205 B2 * | 5/2012 | Chen | ..................... | H02M 3/156 |
| | | | | 323/282 |
| 2013/0038310 A1 * | 2/2013 | Menegoli | .............. | H02M 3/156 |
| | | | | 323/288 |
| 2013/0099761 A1 * | 4/2013 | Dong | .................... | H02M 3/156 |
| | | | | 323/288 |
| 2015/0311798 A1 * | 10/2015 | Yuan | ..................... | H02M 3/156 |
| | | | | 323/288 |

FOREIGN PATENT DOCUMENTS

| | | |
|---|---|---|
| CN | 203722465 U | 7/2014 |
| CN | 104539154 A | 4/2015 |

* cited by examiner

*Primary Examiner* — Peter M Novak
(74) *Attorney, Agent, or Firm* — Muncy, Geissler, Olds & Lowe, P.C.

(57) ABSTRACT

A control circuit for a power converter is disclosed. The power converter includes a switching circuit including a first switching transistor and a second switching transistor. The control circuit includes: a comparator having a first input configured to receive at least a reference signal, a second input configured to receive at least a feedback signal and an output configured to output a comparison signal; a minimum off-time generation circuit; an on-time generation circuit for producing an on-time signal for controlling both the first switching transistor and the second switching transistor; and a ramp compensation circuit configured to generate a ramp compensation signal.

14 Claims, 6 Drawing Sheets

(a)

(b)

POWER CONVERTER AND CONTROL CIRCUIT THEREOF

CROSS-REFERENCE TO RELATED APPLICATION

This application claims the priority of Chinese patent application number 202011622801.3, filed on Dec. 31, 2020, the entire contents of which are incorporated herein by reference.

TECHNICAL FIELD

This application relates primarily to the field of power electronics, and particularly to a power converter and a control circuit thereof.

BACKGROUND

Control of a power converter may be accomplished by various means such as voltage control, current control, hysteretic control and constant on-time (COT) control. Among these, COT control has found extensive use thanks to its excellent dynamic response and relatively high efficiency under light loading.

Despite the fast dynamic response and desirable efficiency under light loading, COT control is imposing stringent requirements on the output voltage's ripple shape. However, voltage ripple is known to be detrimental to the load when present at a significant level. Traditionally, this was mitigated usually by a ramp compensation signal superimposed on a feedback signal or voltage reference. However, insufficient compensation might lead to oscillation of the output voltage during a transient response.

Currently, this problem is commonly addressed by introducing an output current dependent DC bias in the ramp compensation signal, which may be formed from, for example, a current from a synchronous rectifier transistor in a buck-type switched-mode power supply circuit. This, however, may induce a considerable DC error that requires an extremely complicated circuit for correction. Moreover, sampling accuracy may be degraded due to a narrow sampling window at a high operating frequency of the circuit.

SUMMARY OF THE INVENTION

The problem to be solved hereby is to provide a power converter incorporating a ramp compensation circuit allowing stable circuit operation through enhanced compensation capabilities without relying on DC bias settings.

The above problem is solved by a control circuit for a power converter provided herein. The power converter comprises a switching circuit including a first switching transistor and a second switching transistor. The switching circuit is configured to receive an input voltage and responsively convert the input voltage into an output voltage. The control circuit comprises: a comparator provided with a first input, a second input and an output; the first input of the comparator is configured to receive at least a reference signal, the second input of the comparator is configured to receive at least a feedback signal, the output of the comparator is configured to output a comparison signal, the feedback signal derived from the output voltage;

an on-time generation circuit configured to generate an on-time signal, wherein a first control signal for controlling the first switching transistor and a second control signal for controlling the second switching transistor are derived from the on-time signal by a drive circuit; and a ramp compensation circuit configured to generate a ramp compensation signal, wherein the first or second input of the comparator receives a superposition of the ramp compensation signal and the feedback signal, wherein the ramp compensation signal has a first slope peak in a steady state and a second slope peak lower than the first slope peak during a transient response to a load current jump, and wherein a transition from the first slope peak to the second slope peak is irrespective of DC bias settings of the ramp compensation circuit.

In one embodiment hereof, the ramp compensation circuit may comprise: a compensation capacitor provided with a first terminal and a second terminal, the second terminal of the compensation capacitor connected to a reference ground, the first terminal of the compensation capacitor generating the ramp compensation signal; and a compensation capacitor control circuit configured to cause the transition of the ramp compensation signal from the first slope peak to the second slope peak during the transient response by controlling a charging/discharging circuit.

In one embodiment hereof, the compensation capacitor control circuit may comprise: a first constant current source provided with an input and an output, the input of the first constant current source configured to connect a supply voltage; a first switch provided with a first terminal, a second terminal and a control terminal, the first terminal of the first switch coupled to the output of the first current source, the control terminal of the first switch configured to receive the first control signal, the second terminal of the first switch connected to the first terminal of the compensation capacitor; a second switch provided with a first terminal, a second terminal and a control terminal, the first terminal of the second switch coupled to the second terminal of the first switch, the control terminal of the second switch configured to receive the second control signal; and a second constant current source provided with an input and an output, the input of the second constant current source coupled to the second terminal of the second switch, the output of the second constant current source connected to the reference ground, and a compensation capacitor provided with a first terminal and a second terminal, the first terminal of the compensation capacitor coupled to the second terminal of the first switch, the second terminal of the compensation capacitor connected to the reference ground, wherein output currents respectively from the first and second constant current sources are configured to have equal values at beginning and end of each period of the ramp compensation signal in steady state.

In one embodiment hereof, the ramp compensation circuit may further comprise an initial value resetting circuit operating at the end of each operational period to reset the ramp compensation signal to a predetermined initial value at the end of each operational period in the steady state.

In one embodiment hereof, the initial value resetting circuit may act at the end of each operational period in a transient state, to accelerate the ramp compensation signal to approach the initial value.

In one embodiment hereof, the initial value resetting circuit may not provide a action at the end of each operational period in a transient state.

In one embodiment hereof, the initial value resetting circuit may allow the ramp compensation signal to return to the predetermined initial value at the end of each operational period in the steady state through charging or discharging the compensation capacitor.

In one embodiment hereof, the initial value resetting circuit may comprise: a first power transistor provided with a first source, a first drain and a first gate, the first source connected to a second terminal of a first switch, the first drain connected to the reference ground or a supply voltage; a second comparator provided with a first input, a second input and an output, the first input of the second comparator receiving an initial value for each period of the ramp compensation signal, the output of the second comparator connected to the first gate; a sampling control switch provided with a first terminal, a second terminal and a control terminal, the first terminal of the sampling control switch connected to the first source of the first power transistor, the second terminal of the sampling control switch connected to the second input of the second comparator, the control terminal of the sampling control switch receiving a sampling control signal for closing the sampling control switch at the end of each operational period; and a holding capacitor provided with a first terminal and a second terminal, the first terminal of the holding capacitor connected to the second terminal of the sampling control switch, the second terminal of the holding capacitor connected to the reference ground.

Herein, there is also provided a power converter, comprising: a switching circuit comprising a first switching transistor and a second switching transistor, the switching circuit configured to receive an input voltage and convert the input voltage to an output voltage; and a control circuit comprising: a comparator provided with a first input, a second input and an output, the first input of the comparator configured to receive a reference signal, the second input of the comparator configured to receive a feedback signal, the output of the comparator configured to output a comparison signal, the feedback signal derived from the output voltage; an on-time generation circuit configured to generate an on-time signal, wherein a first control signal for controlling the first switching transistor and a second control signal for controlling the second switching transistor are derived from the on-time generation circuit by a drive circuit; and a ramp compensation circuit configured to generate a ramp compensation signal, wherein the first or second input of the comparator receives a superposition of the ramp compensation signal and the feedback signal, wherein the ramp compensation signal has a first slope peak in a steady state and a second slope peak lower than the first slope peak during a transient response to a load current jump, and a transition from the first slope peak to the second slope peak is irrespective of DC bias settings of the ramp compensation circuit.

Compared to the prior art, the application has the following advantages: the power converter provided herein performs COT control with enhanced compensation using a ramp compensation signal produced by a ramp compensation circuit, which allows cumulative compensation irrespective of DC bias settings. As a result, in the event of a load jump, the power converter circuit can still stably operate without output voltage oscillation.

BRIEF DESCRIPTION OF THE DRAWINGS

The accompanying drawings, which are incorporated in and constitute a part hereof, illustrate embodiments to facilitate the understanding of this application and, together with the specification, serve to explain the disclosed principles. In these figures.

DETAILED DESCRIPTION

Objects, features and advantages of the present application will become more apparent from the following detailed description of specific embodiments hereof, which is to be read in connection with the accompanying drawings.

In the following description, numerous details are set forth so that a full understanding of this application may be acquired. However, the application may be practiced in other forms than those described herein. Therefore, the application is in no way limited to the particular embodiments described hereinafter.

As used herein, the singular forms "a", "an" and/or "the" are intended to include the plural forms as well, unless the context clearly indicates otherwise. In general, the terms "comprising" and "including" only imply the presence of expressly stated steps and elements, which do not constitute an exclusive list though, as other steps or elements may also be included.

In addition, it is to be noted that although the terms first, second, etc. may be used to describe various elements, these terms are only used to distinguish one element from another and have no special meaning unless otherwise stated. Therefore, they should not be construed as limiting the scope of this application in any sense. Additionally, although the terms used herein are selected from common general terms, some terms mentioned in the description of embodiments hereof may be selected by the applicant at his or her discretion, and the detailed meanings thereof are explained in the relevant part of the description herein. Further, the present application should be understood not only by the terms actually used, but also by the meaning contained in each term.

It will be understood that when an element is referred to as being "on", "connected to", "coupled to" or "in contact with" another element, it can be directly on, connected or coupled to, or in contact with the other element or intervening elements may also be present. In contrast, when an element is referred to as being "directly on", "directly connected to", "directly coupled to" or "in direct contact with" another element, there are no intervening elements present. Similarly, when a first element is referred to as being "electrically connected to" or "electrically coupled to" a second element, it is meant that there is an electrical path allowing the passage of a current therethrough between the first and second elements. Such an electrical path may include a capacitor, coupled inductor and/or other element that allows a current to pass therethrough even when there is no direct contact between conductive elements.

In embodiments hereof, there is provided a power converter, as well as a control circuit and control method thereof.

Figure 1:
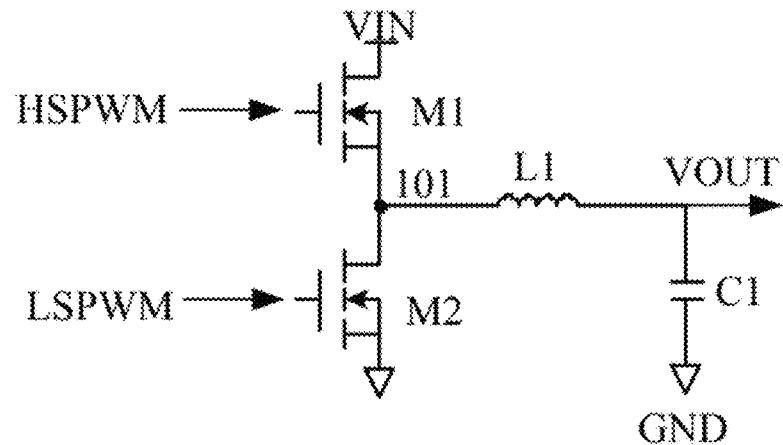
FIG. 1 is a schematic circuit diagram of a power converter according to an embodiment hereof.
Figure 1:
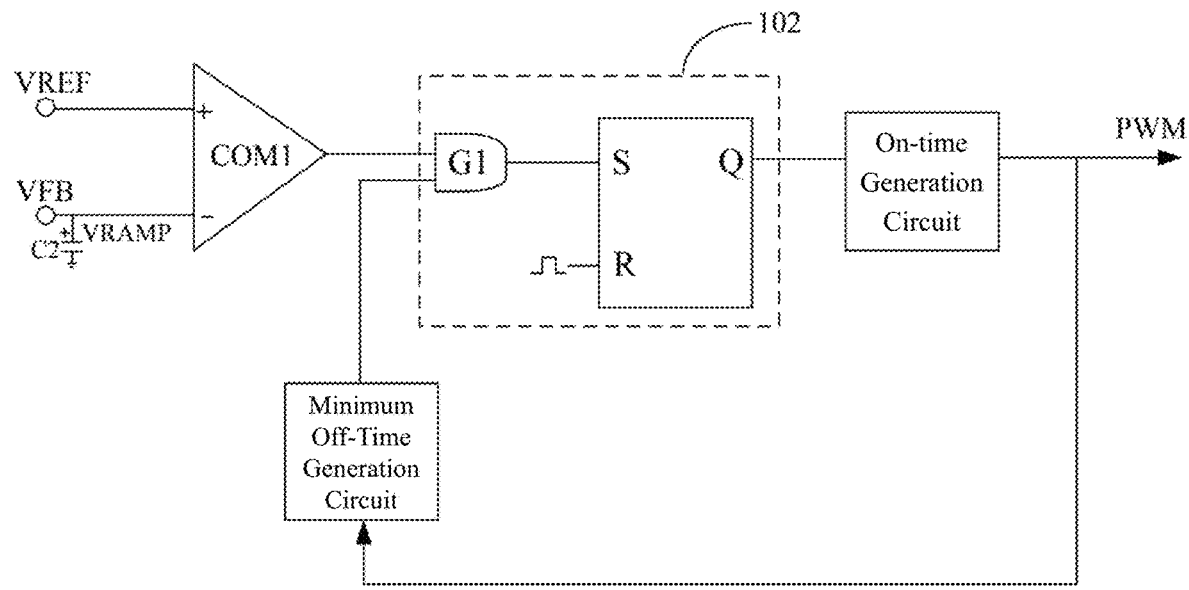

FIG. 1 is a schematic circuit diagram of a power converter according to an embodiment hereof, in which a switching circuit is shown by FIG. 1(a) and a control circuit in the power converter is shown by FIG. 1(b). As shown in FIG. 1(a), the switching circuit includes a first switching transistor M1 and a second switching transistor M2. In one embodiment, each of the first switching transistor M1 and the second switching transistor M2 has a source, a gate and a drain. The first switching transistor M1 is connected in series to the second switching transistor M2. Specifically, the source of the first switching transistor M1 is connected to the drain of the second switching transistor M2 at a node 101. A first terminal of the output inductor L1 is coupled to the node 101, and a second terminal of L1 is connected to a first terminal of an output capacitor C1, with a second terminal of the output capacitor C1 being grounded.

With continued reference to FIG. 1(a), an input voltage VIN is received at the drain of the first switching transistor M1 in the switching circuit, and the source of the second switching transistor is grounded. The gates of the first switching transistor M1 and the second switching transistor M2 are configured to receive a first control signal HSPWM and a second control signal LSPWM, respectively. An output voltage VOUT is present at the first terminal of the output capacitor C1. The first switching transistor M1 and the second switching transistor M2 may be, for example, NMOS transistors. However, other types of transistors may also be used as actually required.

As shown in FIG. 1(b), in one embodiment, the control circuit in the power converter includes a comparator COM1, a logic circuit 102, an on-time generation circuit, a minimum off-time generation circuit and a ramp compensation circuit.

Referring to FIG. 1(b), the comparator COM1 has a first input, a second input and an output. The first input receives a reference signal VREF, and the second input receives a feedback signal VFB. The logic circuit 102 includes a first input, a second input and an output. The first input of the logic circuit is coupled to the output of the comparator COM1 to receive a comparison signal. The second input of the logic circuit is coupled to an output of the minimum off-time generation circuit to receive a minimum off-time signal. The output of the logic circuit 102 is coupled to an input of the on-time generation circuit. An on-time signal PWM is formed at an output of the on-time generation circuit. The first control signal HSPWM and the second control signal LSPWM are derived from the on-time signal PWM by a drive circuit (not shown) and are configured to switch on/off the first switching transistor M1 and the second switching transistor M2, respectively. The feedback signal VFB is derived from the output voltage VOUT. For example, VFB is obtained by scaling VOUT with a factor k, which may lie within the range of 0<k≤1. In exemplary specific implementations, the feedback signal VFB may be derived from the output voltage VOUT via a voltage-division resistor network.

The minimum off-time generation circuit is configured to overcome the influence of the parasitic capacitance of the circuit elements themselves, e.g., the switching transistors, avoiding the circuit from being switched on again before the output voltage of the circuit being switched off drops to zero and thus causing additional circuit loss and conduction and radiation interference or damage to circuit elements.

A ramp compensation signal VRAMP generated by the ramp compensation circuit is received at the first or second input of the comparator. Specifically, a positive slope compensation may be connected to the comparator's VFB terminal, or a negative slope compensation may be connected to the comparator's VREF terminal. In the latter case, a minimum value of the descending slope may be referred to as a slope peak. The ramp compensation circuit includes a compensation capacitor C2. In FIG. 1(b), a first terminal of the compensation capacitor C2 is coupled to the second input of the comparator, and a second terminal of the compensation capacitor C2 is grounded.

In one embodiment, the logic circuit 102 includes an AND gate G1 and an RS flip-flop. First and second inputs of the AND gate G1 are coupled to the outputs of the comparator and the minimum off-time generation circuit in order to receive the comparison signal and the minimum off-time signal, respectively. An output of the AND gate G1 is connected to an S terminal of the RS flip-flop, and a Q terminal of the RS flip-flop is coupled to the input of the on-time generation circuit in order to provide an excitation signal. A reset signal is received at an R terminal of the RS flip-flop. The reset signal may be either a synchronous signal or an asynchronous signal.

During operation of the circuit, when a voltage at the first input of the comparator is higher than a voltage at the second input, the output of the comparator, i.e., the comparison signal, is pulled high. If the output of the minimum off-time generation circuit is also high, the output of the AND gate G1 is set high. In response to the excitation signal being received at the S terminal of the RS flip-flop, an output signal is provided at the Q terminal, which is coupled to the input of the on-time generation circuit, enabling an on-time timer. The on-time signal PWM is produced at the output of the on-time generation circuit and then passed through the drive circuit, resulting in generating the first control signal HSPWM for switching on/off the first switching transistor M1 and generating the second control signal LSPWM for switching on/off the second switching transistor M2 and thus enabling power conversion. In one embodiment, the on-time signal is inversely proportional to the input voltage VIN and proportional to the output voltage VOUT in amplitude. This allows the switching circuit to maintain a substantially constant switching frequency under various conditions of the input voltage VIN and the output voltage VOUT.

Voltages that may present at the second input of the comparator include the feedback voltage VFB and the slope compensation voltage (i.e., the ramp compensation signal) VRAMP. When in absence of the ramp compensation signal VRAMP, in spite of providing fast dynamic response and satisfactory efficiency under light loading, constant on-time (COT) control may impose strict requirements on the output voltage's ripple shape. When the output capacitor has a very small equivalent series resistance (ESR), as ripple on the output capacitor C1 lags behind a current $I_L$ in the output inductor L1 in phase by 90 degrees, the output voltage does not reflect variation in inductor current $I_L$ in a timely manner. When the first control signal HSPWM (and thus the on-time signal PWM) is high, the inductor current $I_L$ increases, but due to the 90-degree phase offset, the output voltage VOUT cannot be established in time, failing to cause the feedback voltage VFB to ramp. Consequently, it may occur that VFB remains lower than VREF after a current switch-on period of the HSPWM signal has elapsed, creating an unwanted additional PWM pulse, which may lead to unequal intervals of the signal PWM and unstable operation. Therefore, increased circuit stability can be obtained by adding the ramp compensation signal VRAMP to the feedback signal VFB or by subtracting the ramp compensation signal VRAMP from VREF.

Figure 4:
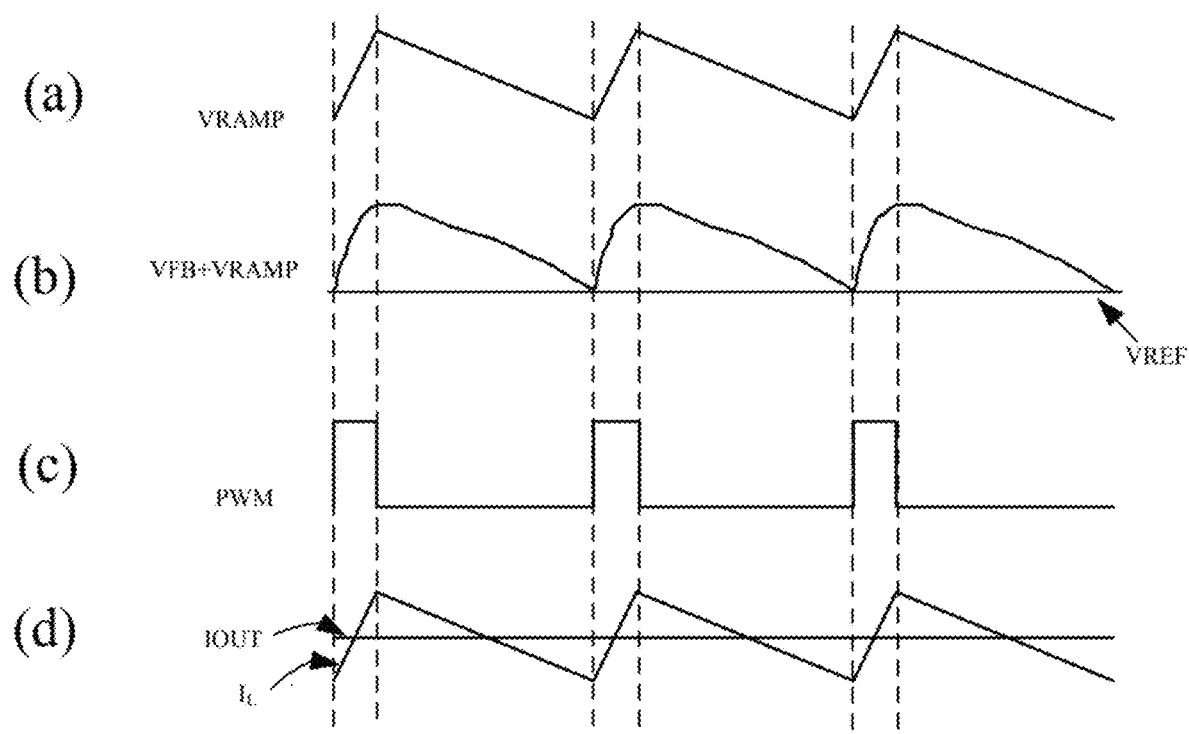
FIG. 4 schematically illustrates slope compensation waveforms in the power converter in steady-state operation according to an embodiment hereof.

The ramp compensation signal VRAMP is a periodic signal with the same period as the signal PWM, and this period may also be referred to as an operational period. Amplitude of the VRAMP signal may vary within a fixed range. For example, the ramp compensation signal VRAMP may be in the form of a periodic serrated wave, as shown in FIG. 4(a). FIG. 4(a) schematically illustrates slope compensation waveforms in the power converter in steady-state operation according to an embodiment hereof. FIG. 4(b) shows a waveform of the feedback signal VFB superimposed with the ramp compensation signal VRAMP. FIG. 4(c) shows a waveform of the on-time signal PWM. Waveforms of the inductor current IL and an output current $I_{OUT}$ can be seen from FIG. 4(d). $I_{OUT}$ is a load current, and its waveform is dependent on the characteristics of the load. For example, if the load is operating at an intermittent constant current, the load current $I_{OUT}$ may transition between different values. Alternatively, if the load is operating in a constant current mode, the load current may maintain a substantially constant value.

Figure 5:
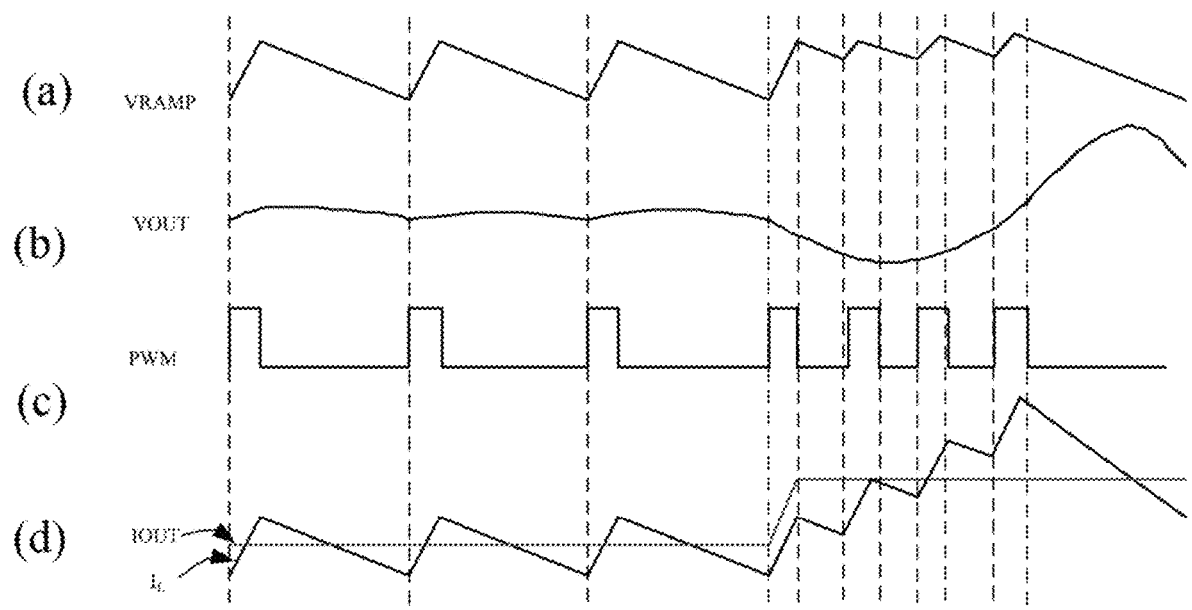
FIG. 5 is a schematic diagram showing waveforms of the power converter with the amplitude of the ramp compensation signal varying within a fixed range in the event of a load jump according to an embodiment hereof.

The slope compensation solution as discussed above can ensure good circuits stability in steady-state operation of the power converter circuit. However, if circuit's load is experiencing a sudden jump which leads to a considerable decrease in amplitude of the output voltage VOUT, limiting the amplitude of the ramp compensation signal VRAMP limited within a fixed range will make it impossible to correct the phase delay of the output voltage VOUT and may thus lead to oscillation of the output voltage and unstable operation of the circuit. FIG. 5 is a schematic diagram showing waveforms of the power converter with the amplitude of the ramp compensation signal varying within a fixed range in the event of a load jump according to an embodiment hereof FIG. 5(c) shows a waveform of the on-time signal PWM. FIG. 5(a) shows a waveform of the ramp compensation signal VRAMP. FIG. 5(b) shows a waveform of the output voltage VOUT. As can be seen from FIG. 5(b), noticeable oscillation occurs to the output voltage VOUT. FIG. 5(d) shows waveforms of the output current $I_{OUT}$ and the inductor current $I_L$.

In some embodiments hereof, in order to enable the power converter operating in a COT control mode to have improved performance with operational stability both in steady-state operation and in the event of a load jump, the ramp compensation circuit comprises a compensation capacitor C2 and a compensation capacitor control circuit capable of controlling a charge/discharge circuit to cause the ramp compensation signal to transiently transition from a first slope peak to a second slope peak.

Figure 2:
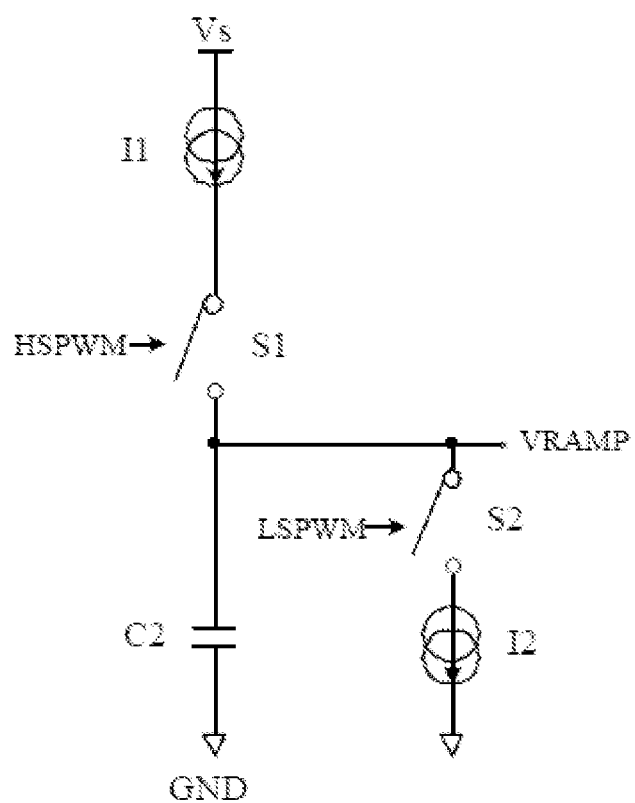
FIG. 2 is a schematic diagram illustrating the structure of a ramp compensation circuit according to an embodiment hereof.

FIG. 2 is a schematic diagram illustrating the structure of the ramp compensation circuit according to an embodiment hereof. As shown in FIG. 2, the compensation capacitor control circuit in the ramp compensation circuit includes a first constant current source I1, a first switch S1, a second constant current source I2 and a second switch S2. The first constant current source I1 has an input and an output, and the input is connected to a supply voltage Vs. The first switch S1 has a first terminal, a second terminal and a control terminal; the first terminal is connected to the output of the first constant current source I1; the control terminal is configured to receive the first control signal HSPWM; the second terminal is coupled to a first terminal of the compensation capacitor C2. A second terminal of the compensation capacitor C2 is connected to a reference ground. The second switch S2 has a first terminal, a second terminal and a control terminal; the first terminal of S2 is coupled to the second terminal of the first switch S1 and hence to the first terminal of the compensation capacitor C2; the control terminal of S2 is configured to receive the second control signal LSPWM; the second terminal of S2 is connected to a first terminal of the second constant current source I2. A second terminal of the second constant current source I2 is connected to the reference ground. The ramp compensation signal VRAMP is generated at the first terminal of the compensation capacitor C2.

In one embodiment, output currents respectively from the first and second constant current sources are configured to have equal values at the beginning and end of each period of the ramp compensation signal in steady-state operation.

Specifically, when the on-time signal PWM, and hence the first control signal HSPWM in the switching circuit of the power converter, is high, the first switch S1 is closed in response to the control signal received at the control terminal, initiating charging of the compensation capacitor C2 by the first constant current source I1. Similarly, when the signal PWM is low, while the control signal LSPWM for the second switching transistor M2 is high, the second switch S2 is closed in response to the control signal received at the control terminal, initiating discharging of the compensation capacitor C2 via the second current source I2. Parameters of the constant current sources I1 and I2 may be configured so that equal amounts of charge are transferred into and from the compensation capacitor C2 in each period in steady-state operation of the circuit.

In some embodiments, the ramp compensation circuit additionally includes an initial value resetting circuit, which operates at the end of each operational period to reset the ramp compensation signal to a predetermined initial value in steady-state operation of the circuit. The end of each operational period may refer to an operating period of the initial value resetting circuit from its activation in response to a difference between [VFB+VRAMP] (i.e., the feedback signal VFB superimposed with the ramp compensation signal VRAMP) and the reference signal VREF reaching a preset threshold to its deactivation at the expiry of VRAMP's operational period or after the elapse of a fixed length of time.

In one embodiment, the initial value resetting circuit may transiently act at the end of each operational period to accelerate the ramp compensation signal VRAMP to approach the initial value. In this case, the end of each operational period may refer to an operating period of the initial value resetting circuit from its activation in response to a difference between [VFB+VRAMP] (i.e., the feedback signal VFB superimposed with the ramp compensation signal VRAMP) and the reference signal VREF reaching a preset threshold to its deactivation at the expiry of VRAMP's operational period or after the elapse of a fixed length of time, as described above. The transient action of the initial value resetting circuit in the control circuit of the power converter allows rapid return of VRAMP to its steady-state level after peaking as a transient response and avoids simple reliance on charging/discharging of the capacitor for decreasing the amplitude of VRAMP, which may proceed too slowly. In an alternative embodiment, the initial value resetting circuit may not provide such a transient action at the end of each operational period. In this case, the end of each operational period may refer to a period from the time of a difference between [VFB+VRAMP] and the reference signal VREF reaching a preset threshold to the expiry of VRAMP's operational period.

Figure 3A:
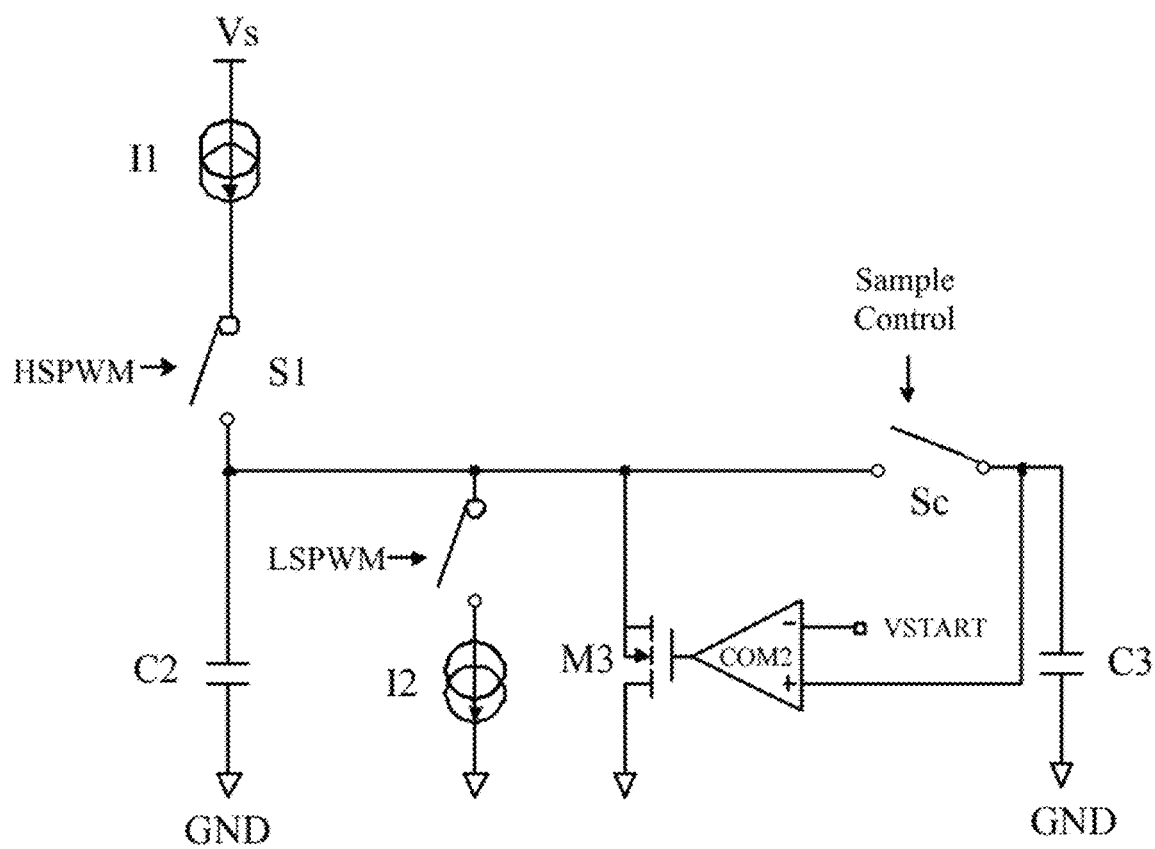
FIG. 3A is a schematic diagram illustrating the structure of a ramp compensation circuit according to an embodiment hereof.

FIG. 3A is a structural schematic of the ramp compensation circuit according to an embodiment hereof, showing structural details of the initial value resetting circuit. As shown in FIG. 3A, in some implementations, the initial value resetting circuit includes a sample-and-hold circuit and a control circuit, configured to adjust a charging current from the first constant current source I1 and/or a discharging current toward the second constant current source I2. By charging or discharging the compensation capacitor, the initial value resetting circuit allows the ramp compensation signal to be reset to the predetermined initial value at the end of each operational period in steady-state operation.

Specifically, the initial value resetting circuit may include a first power transistor M3, a second comparator COM2, a sampling control switch Sc and a holding capacitor C3. The first power transistor M3 may have a first source, a first drain and a first gate; the first source of M3 is connected to the second terminal of the first switch S1 and hence to the first terminal of the compensation capacitor C2; the first drain of M3 is connected to the reference ground or supply voltage Vs. The second comparator COM2 may have a first input, a second input and an output; the first input of COM2 is configured to receive an initial value VS TART for each period of the ramp compensation signal in steady-state operation; the output of Com2 is connected to the first gate of the first power transistor M3. As actually required, either of the first and second inputs of the comparator may be used as an inverting input, and the other as a non-inventing input.

The sampling control switch Sc may have a first terminal, a second terminal and a control terminal: the first terminal of the sampling control switch Sc is connected to the first source of the first power transistor M3; the second terminal of Sc is connected to the second input of the second comparator COM2; the control terminal of Sc is configured to receive the sampling control signal (labeled as "Sample Control"). In one embodiment, the sampling control signal closes the sampling control switch at the end of each operational period. The holding capacitor C3 may have a first terminal and a second terminal; the first terminal of C3 is connected to the second terminal of the sampling control switch Sc; the second terminal of C3 is connected to the reference ground GND.

Figure 3B:
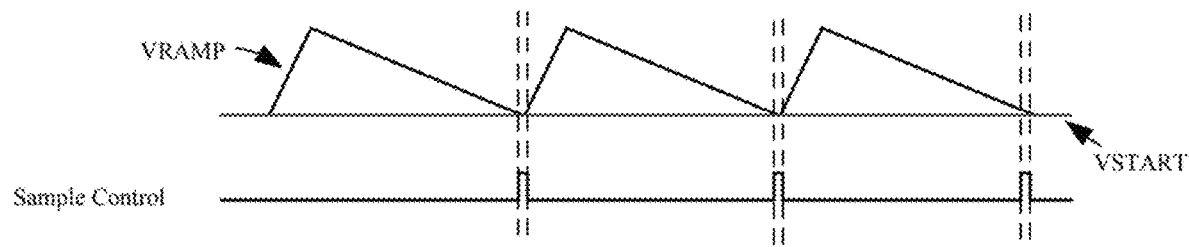
FIG. 3B is a schematic waveform diagram showing a sampling control signal in the ramp compensation circuit according to an embodiment hereof.

FIG. 3B is a schematic waveform diagram showing the sampling control signal ("Sample Control") in the ramp compensation circuit according to an embodiment hereof. As shown in FIG. 3B, in steady-state operation of the power converter, the sampling control signal ("Sample Control") is set high at the end of each operational period of the ramp compensation signal VRAMP, e.g., in response to a difference between [VFB+VRAMP] and the reference signal VREF reaching a preset threshold and maintained high for a period of time Td, making the signal equivalent to narrow pulses. Alternatively, the high level may be maintained until the expiry of each operational period. During each narrow pulse with the high level, the sampling control switch Sc is closed. In other words, the sampling control signal closes the sampling control switch Sc at the end of each operational period. The second comparator COM2 compares the first input voltage VSTART with a sampled voltage value received at the second input. If the sampled voltage value received at the second input is greater than that of VS TART, the first power transistor M3 is turned on, causing value of VRAMP to decrease to the initial value VS TART for each period of the ramp compensation signal in steady-state operation.

Upon a load jump occurring in the power converter, the ramp compensation circuit disclosed herein allows the amplitude of the ramp compensation signal VRAMP to cumulate rather than being fluctuated in a fixed amplitude range as being limited by the maximum amplitude. This enables compensation for the phase delay of output voltage ripple and ensures good stability of the power converter circuit despite the load jump. In this case, VRAMP remains in the form of a serrated wave but has amplitude that can be cumulated. Moreover, an adjustment process may follow the load jump to reverse the increased amplitude of VRAMP back to the predetermined initial value, i.e., the initial value VS TART in steady-state operation. As a result, the output voltage VOUT also returns to a value in steady-state operation. Further, this is done without using a DC biasing circuit, allowing the compensation capacitor control circuit to have a simpler structure.

Figure 6:
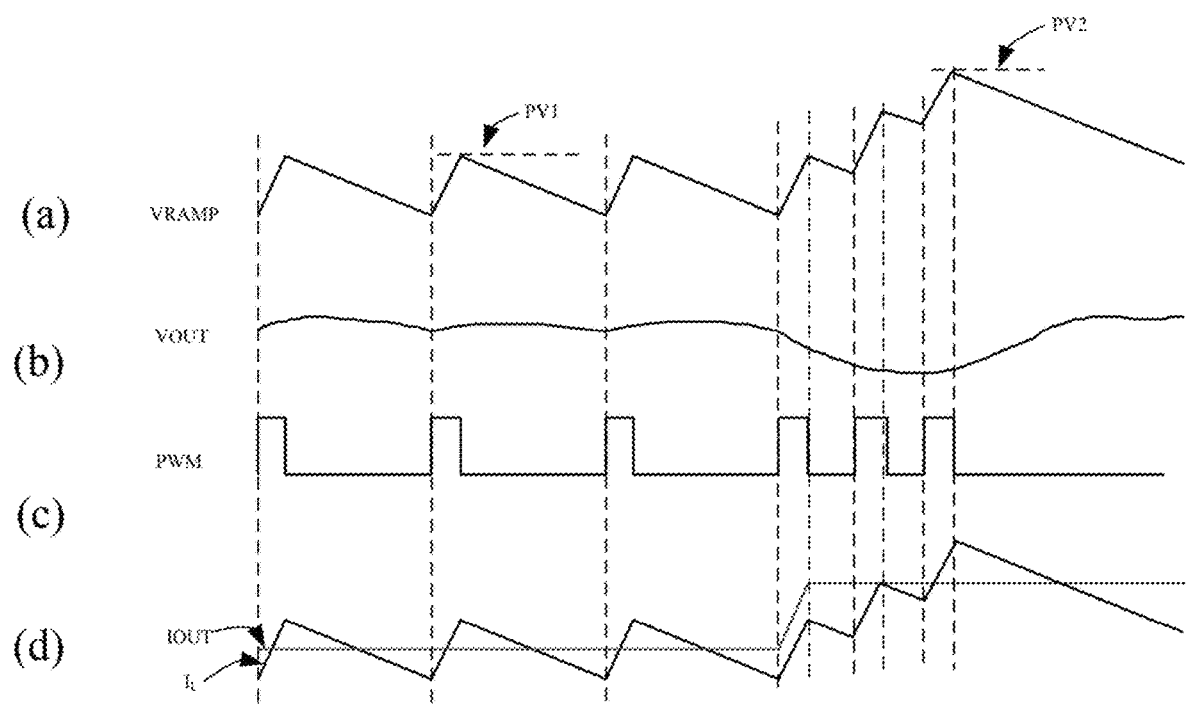
FIG. 6 is a schematic diagram showing waveforms of the power converter with the amplitude of the ramp compensation signal cumulated in the event of a load jump according to an embodiment hereof.

FIG. 6 is a schematic diagram showing waveforms of the power converter with the amplitude of the ramp compensation signal cumulated in the event of a load jump according to an embodiment hereof FIG. 6(c) shows a waveform of the on-time signal PWM. FIG. 6(a) shows a waveform of the VRAMP ramp compensation signal. The ramp compensation signal has a first slope peak PV1 in steady-state operation and a second slope peak PV2 during a transient response of the ramp compensation signal, for example, as shown particularly in FIG. 6(a). FIG. 6(b) shows a waveform of the output voltage VOUT. FIG. 6(d) shows waveforms of the output current $I_{OUT}$ and the inductor current $I_L$. As can be seen from FIG. 6(b), there is no noticeable oscillation of the output voltage VOUT. Following the occurrence of the dynamic load jump in the power converter, the output voltage VOUT is brought back to the same condition as in steady-state operation through adjustment by the on-time signal PWM and cumulative compensation by VRAMP.

In this application, there is also provided a power converter comprising the switching circuit and control circuit as defined above.

The power converter disclosed herein performs COT control with enhanced compensation using a ramp compensation signal produced by a ramp compensation circuit, which allows cumulative compensation irrespective of DC bias settings. As a result, in the event of a load jump, the power converter circuit can still stably operate without output voltage oscillation.

Herein, particular phrases are used to describe embodiment(s) hereof. For example, "one embodiment", "an embodiment" and/or "some embodiments" are intended to refer to a particular feature, structure, or characteristic related to at least one embodiment hereof Thus, it is to be noted and stressed that appearances of the phrases "one embodiment", "an embodiment" or "an alternative embodiment" mentioned separately in two or more times places throughout this specification are not necessarily all referring to the same embodiment. Furthermore, the particular features, structures or characteristics described in connection with one or more embodiments may be combined in any suitable manner.

Similarly, it should be appreciated that, in the foregoing description of embodiments hereof, various features are sometimes grouped together in a single embodiment, figure, or description thereof for the purpose of streamlining the disclosure and aiding in the understanding of one or more of the embodiments hereof. This method of disclosure, however, is not to be interpreted as reflecting an intention that the claimed subject matter hereof requires more features than are expressly recited in each claim. Rather, as the following claims reflect, embodiments lie in less than all features of a single foregoing disclosed embodiment.

While the present application has been described with reference to embodiments illustrated and described herein, those of ordinary skill in the art will recognize that the above embodiments are merely illustrative of this application and various equivalent modifications or substitutions can be made thereto substantially within the spirit hereof Therefore, any and all changes and variations made to the foregoing embodiments within the essential scope of spirit of the present application fall within the scope of the appended claims.

What is claimed is:

1. A control circuit for a power converter, the power converter comprising a switching circuit, wherein: the switching circuit comprises a first switching transistor and a second switching transistor; and the switching circuit is configured to receive an input voltage and responsively convert the input voltage into an output voltage, wherein a constant on-time control is performed by the control circuit for the power converter, and wherein the control circuit comprises:
   a comparator provided with a first input, a second input and an output, wherein: the first input of the comparator is configured to receive at least a reference signal; the second input of the comparator is configured to receive at least a feedback signal; and the output of the comparator is configured to output a comparison signal, and wherein the feedback signal is derived from the output voltage;
   an on-time generation circuit configured to generate an on-time signal, wherein a first control signal for controlling the first switching transistor and a second control signal for controlling the second switching transistor are derived from the on-time signal by a drive circuit;
   a ramp compensation circuit configured to generate a ramp compensation signal, wherein the first or second input of the comparator receives a superposition of the ramp compensation signal and the feedback signal, wherein the ramp compensation signal has a first slope peak in a steady state and has a second slope peak lower than the first slope peak during a transient response to a load current jump, and wherein a transition from the first slope peak to the second slope peak is irrespective of DC bias settings of the ramp compensation circuit, wherein the ramp compensation circuit comprises an initial value resetting circuit, and wherein the initial value resetting circuit comprises:
   a first power transistor provided with a first source, a first drain and a first gate, wherein: the first source is connected to a second terminal of a first switch; and the first drain is connected to the reference ground or a supply voltage;
   a second comparator provided with a first input, a second input and an output, wherein: the first input of the second comparator receives an initial value for each period of the ramp compensation signal; and the output of the second comparator is connected to the first gate;
   a sampling control switch provided with a first terminal, a second terminal and a control terminal, wherein: the first terminal of the sampling control switch is connected to the first source of the first power transistor; the second terminal of the sampling control switch is connected to the second input of the second comparator; and the control terminal of the sampling control switch receives a sampling control signal for closing the sampling control switch at the end of each operational period; and
   a holding capacitor provided with a first terminal and a second terminal, wherein: the first terminal of the holding capacitor is connected to the second terminal of the sampling control switch; and the second terminal of the holding capacitor is connected to the reference ground.

2. The control circuit of claim 1, wherein the ramp compensation circuit further comprises:
   a compensation capacitor provided with a first terminal and a second terminal, wherein: the second terminal of the compensation capacitor is connected to a reference ground; and the first terminal of the compensation capacitor generates the ramp compensation signal; and
   a compensation capacitor control circuit configured to cause the transition of the ramp compensation signal from the first slope peak to the second slope peak during the transient response by controlling a charging/discharging circuit.

3. The control circuit of claim 2, wherein the compensation capacitor control circuit comprises:
   a first constant current source provided with an input and an output, wherein the input of the first constant current source is configured to connect a supply voltage;
   a first switch provided with a first terminal, a second terminal and a control terminal, wherein: the first terminal of the first switch is coupled to the output of the first current source; the control terminal of the first switch is configured to receive the first control signal; and the second terminal of the first switch is connected to the first terminal of the compensation capacitor;
   a second switch provided with a first terminal, a second terminal and a control terminal, wherein: the first terminal of the second switch is coupled to the second terminal of the first switch; and the control terminal of the second switch is configured to receive the second control signal; and
   a second constant current source provided with an input and an output, wherein: the input of the second constant current source is coupled to the second terminal of the second switch; and the output of the second constant current source is connected to the reference ground, and wherein output currents respectively from the first and second constant current sources are configured to have equal values at beginning and end of each period of the ramp compensation signal in steady-state operation.

4. The control circuit of claim 1, wherein the initial value resetting circuit operates at the end of each operational period to reset the ramp compensation signal to a predetermined initial value at the end of each operational period in the steady state.

5. The control circuit of claim 4, wherein the initial value resetting circuit acts at the end of each operational period in a transient state, to accelerate the ramp compensation signal to approach the initial value.

6. The control circuit of claim 4, wherein the initial value resetting circuit does not act at the end of each operational period in a transient state.

7. The control circuit of claim 4, wherein the initial value resetting circuit allows the ramp compensation signal to return to the predetermined initial value at the end of each operational period in the steady state through charging or discharging the compensation capacitor.

8. A power converter, comprising:
a switching circuit, wherein the switching circuit comprises a first switching transistor and a second switching transistor, the switching circuit is configured to receive an input voltage and convert the input voltage to an output voltage; wherein a constant on-time control is performed by the control circuit for the power converter, and
a control circuit comprising:
a comparator provided with a first input, a second input and an output, wherein: the first input of the comparator is configured to receive at least a reference signal; the second input of the comparator is configured to receive at least a feedback signal; and the output of the comparator is configured to output a comparison signal, and wherein the feedback signal is derived from the output voltage;
an on-time generation circuit configured to generate an on-time signal, wherein a first control signal for controlling the first switching transistor and a second control signal for controlling the second switching transistor are derived from the on-time generation circuit by a drive circuit;
a ramp compensation circuit configured to generate a ramp compensation signal, wherein the first or second input of the comparator receives a superposition of the ramp compensation signal and the feedback signal, wherein the ramp compensation signal has a first slope peak in a steady state and has a second slope peak lower than the first slope peak during a transient response to a load current jump, and wherein a transition from the first slope peak to the second slope peak is irrespective of DC bias settings of the ramp compensation circuit, wherein the ramp compensation circuit comprises an initial value resetting circuit, and wherein the initial value resetting circuit comprises:
a first power transistor provided with a first source, a first drain and a first gate, wherein: the first source is connected to a second terminal of a first switch; and the first drain is connected to a reference ground or a supply voltage;
a second comparator provided with a first input, a second input and an output, wherein: the first input of the second comparator receives an initial value for each period of the ramp compensation signal; and the output of the second comparator is connected to the first gate;
a sampling control switch provided with a first terminal, a second terminal and a control terminal, wherein: the first terminal of the sampling control switch is connected to the first source of the first power transistor; the second terminal of the sampling control switch is connected to the second input of the second comparator; and the control terminal of the sampling control switch receives a sampling control signal for closing the sampling control switch at the end of each operational period; and
a holding capacitor provided with a first terminal and a second terminal, wherein: the first terminal of the holding capacitor is connected to the second terminal of the sampling control switch; and the second terminal of the holding capacitor is connected to a reference ground.

9. The power converter of claim 8, wherein the ramp compensation circuit further comprises:
a compensation capacitor provided with a first terminal and a second terminal, wherein: the second terminal of the compensation capacitor is grounded; and the first terminal of the compensation capacitor generates the ramp compensation signal; and
a compensation capacitor control circuit configured to cause the transition of the ramp compensation signal from the first slope peak to the second slope peak during the transient response by controlling a charging/discharging circuit.

10. The power converter of claim 8, wherein the compensation capacitor control circuit comprises:
a first constant current source provided with an input and an output, wherein the input of the first constant current source is configured to connect a supply voltage;
a first switch provided with a first terminal, a second terminal and a control terminal, wherein: the first terminal of the first switch is coupled to the output of the first current source; the control terminal of the first switch is configured to receive the first control signal; and the second terminal of the first switch is connected to the first terminal of the compensation capacitor;
a second switch provided with a first terminal, a second terminal and a control terminal, wherein: the first terminal of the second switch is coupled to the second terminal of the first switch; and the control terminal of the second switch is configured to receive the second control signal; and
a second constant current source provided with an input and an output, wherein: the input of the second constant current source is coupled to the second terminal of the second switch; and
the output of the second constant current source is connected to a reference ground, and wherein output currents respectively from the first and second constant current sources are configured to have equal values at beginning and end of each period of the ramp compensation signal in the steady state.

11. The power converter of claim 8, wherein the initial value resetting circuit operates at the end of each operational period to reset the ramp compensation signal to a predetermined initial value in the steady state.

12. The power converter of claim 11, wherein the initial value resetting circuit acts at the end of each operational period in a transient state, to accelerate the ramp compensation signal to approach the initial value.

13. The power converter of claim 11, wherein the initial value resetting circuit does not act at the end of each operational period in a transient state.

14. The power converter of claim 11, wherein the initial value resetting circuit allows the ramp compensation signal to return to the predetermined initial value at the end of each operational period in the steady state through charging or discharging the compensation capacitor.

* * * * *